June 24, 1924.
D. K. LIPPINCOTT
1,499,112
THERMAL CONTROL SYSTEM AND SWITCH
Filed Feb. 15, 1922
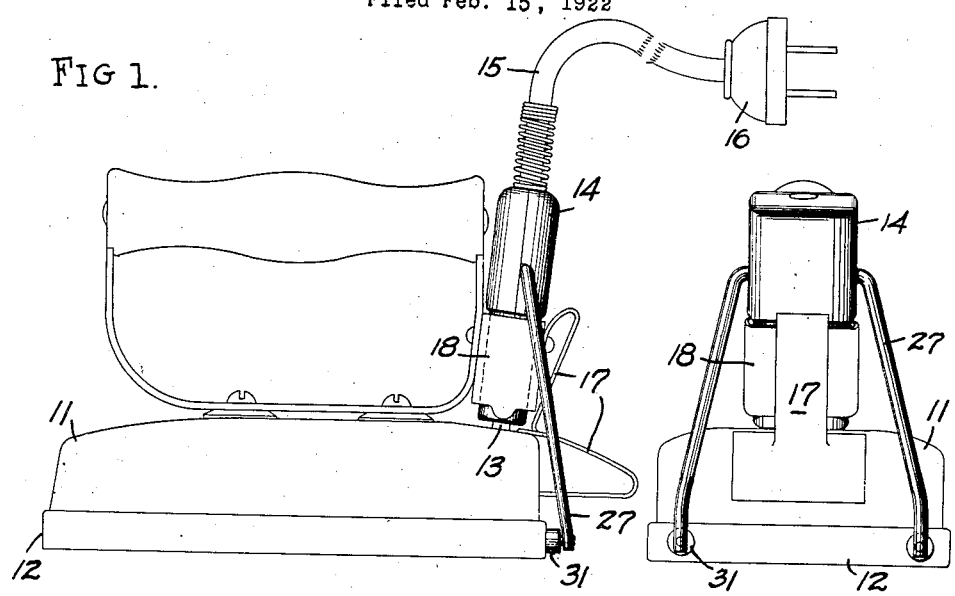
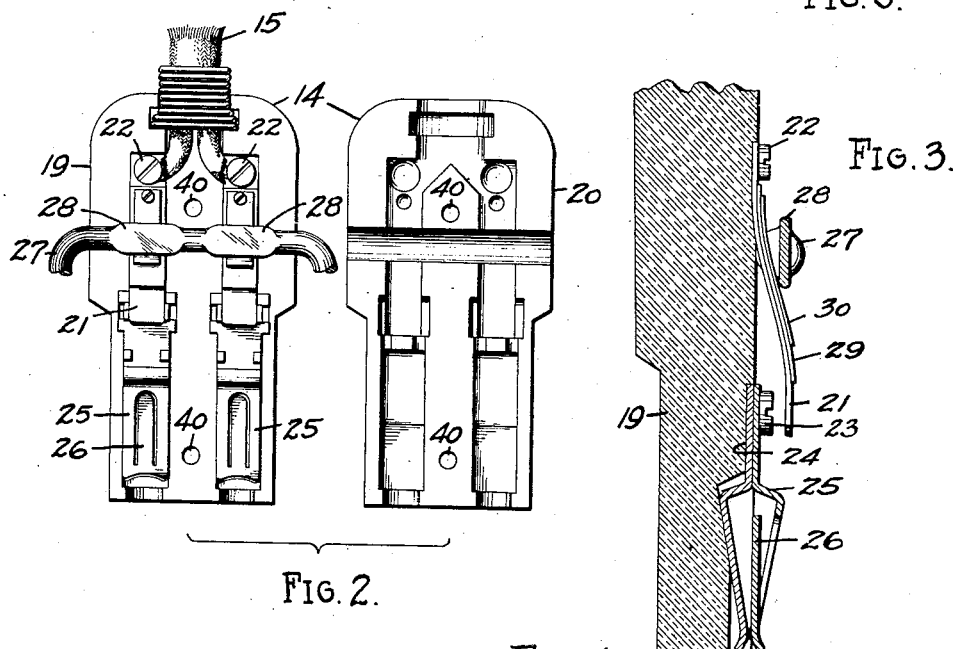
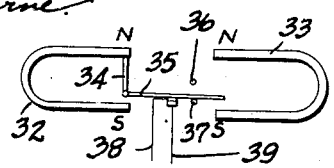
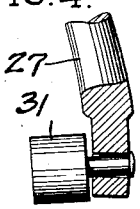
WITNESS
H. Sherburne
INVENTOR
Donald K. Lippincott.
BY
White Prost Evans
his ATTORNEYS Patented June 24, 1924.

1,499,112

UNITED STATES PATENT OFFICE.

DONALD K. LIPPINCOTT, OF SAN FRANCISCO, CALIFORNIA.

THERMAL CONTROL SYSTEM AND SWITCH.

Application filed February 15, 1922. Serial No. 536,829.

*To all whom it may concern:*

Be it known that I, DONALD K. LIPPINCOTT, a citizen of the United States, and a resident of the city and county of San Francisco, State of California, am the inventor of a new and useful Thermal Control System and Switch, of which the following is a specification.

This invention relates to the control of temperature, and more particularly to the maintenance of a heated body within definite limits of temperature.

One of the many applications to which my invention is well adapted, is to the control of electrical household devices, such as flatirons. A large number of fires are caused by the excessive heat generated by devices of that character, since very often the person who operates the device inadvertently leaves the connections completed, although the device is not to be used any longer. It may also happen that the switch is left on purposely, when the operation is interrupted for any reason; and when the interruption is longer than the operator anticipated, the device is apt to heat up enough to ignite fabric or paper located near it. Flatirons alone are the prolific cause of many fires. If left upon wood or fabric as on an ironing board, it is quite likely to ignite them before the household becomes aware that the iron has been unwittingly left connected. Very serious injury both to life and property may easily occur. It is one of the objects of my invention to obviate such occurrences by disconnecting the device when it tends to reach a dangerous temperature.

Temperature responsive switches have been proposed in the past to perform this function, consisting of a bimetallic element located within the body of the iron and arranged to be bowed a varying amount as the temperature varies and to open the circuit when it is bowed sufficiently. So far as I am aware, none of these devices have proven commercially feasible, due probably to the fact that the bimetallic element cannot withstand the severe service required of it, and becomes entirely unreliable with continued use. Furthermore such devices are responsive to the temperature within the body of the device, whereas the temperature on the outside surface of the body is by far the most important by which to regulate. The temperature responsive device of my invention is extremely reliable and simple, and cannot be adversely affected by continued service. Furthermore, the outside surface temperature of the body may readily be made the determining one for operation of the disconnecting switch.

The temperature responsive element of my invention depends upon certain magnetic properties of alloys, of which alloys of the magnetic metals are best known. Some of these alloys, it has been observed, lose the property of becoming magnetized upon reaching a certain temperature. In other words, the permeability reduces to unity, and the presence of such an alloy in a magnetic circuit behaves at the critical temperature as if it constituted merely an air gap. While several kinds of alloys are known to have these characteristics, I find that an ordinary nickel steel or nickel iron alloy will serve my purpose very well. When the nickel is present in quantities in excess of 20%, there is a critical temperature at which it loses its magnetic properties, and regains these properties only when the temperature varies slightly from the critical one. Thus in a 30% nickel alloy, the critical temperature is about 78° centigrade. As the quantity of nickel increases, the critical temperature also increases, and in a 40% nickel alloy this temperature is about 307° centigrade. It is thus seen that the temperature at which the thermal switch operates may be readily controlled by controlling the particular composition of the alloy.

The mechanical arrangement whereby the switch is operated when the alloy loses its magnetic properties may take any one of a large variety of forms. A magnetizing force may be used, as for example a permanent magnet, and the arrangement may be such that the alloy forms a portion of this magnetic circuit. This alloy may conveniently be arranged to be in intimate contact with the body the temperature of which is to be controlled, so that heat may be imparted to it from the body. Upon reaching its critical temperature the alloy may be arranged to move as by the action of gravity or a spring and to operate by its movement the switch contacts. In one of the forms I have illustrated, the body controlled is a flatiron, but of course the same principles of operation may be applied in any other form of thermal control.

Another object of my invention, then, is to apply the principles of the magnetic properties of alloys to a thermal control system whether it be for the control of an electric switch, or of a gas valve, or the like.

Still another object is to provide a switch or valve that operates at a predetermined critical high temperature, and when that temperature is reduced perceptibly, to operate the same switch or valve so as to return it to its original position.

My invention possesses other advantageous features, some of which, with the foregoing will be set forth at length in the following description where I shall outline in full those forms of the invention which I have selected for illustration in the drawings accompanying and forming part of the present specification. In the drawings, I have shown several embodiments of my invention, but it is to be understood that I do not limit myself to those forms, since the invention as expressed in the claims may be embodied in other forms as well.

Referring to the drawings:—

Figure 1 is a side view of an electric iron and its lead embodying my invention;

Fig. 2 shows the lead plug opened up so that the thermally operated switch may be seen therein;

Fig. 3 is an enlarged sectional view through the contacts of Fig. 2;

Fig. 4 is a detail view of a portion of the magnetic circuit which constitutes one of the elements of the control device;

Fig. 5 is a diagrammatic view showing another embodiment of my invention;

Fig. 6 is a rear view of the iron shown in Fig. 1.

Although my invention may be used in a great variety of control systems, I have chosen for detailed illustration a system for controlling the temperature of an electric flatiron 11. This iron is equipped with the usual steel sole plate 12, which is adapted to be heated by an element enclosed within the iron 11. To supply current to this heating element, the usual contact studs 13 are provided, projecting from the rear portion of the iron. Arranged to make connection with these studs is a plug member 14, which is made a part of the usual flexible connection lead 15, carrying at its free end the connection device 16. In order that the iron may be conveniently placed on end, it is shown as supplied with a member 17 of bent-up sheet metal, forming a supporting leg for the iron when placed upon a flat surface. A guide 18 for the plug 14 may also be provided. In addition to the usual contact springs provided for connecting with the posts 13, the plug 14 carries another pair of contacts, so that the connections for the flatiron may be controlled by them. I have found that by locating these supplemental contacts in the plug 14 itself, a compact arrangement may be provided for the entire thermal control.

The arrangement of supplemental contacts within the plug 14 may be best understood from an inspection of Figs. 3 and 4. All of the operative parts of plug 14 are encased in a pair of insulation members 19 and 20. These two parts are adapted to be fastened together by screws, passing through the apertures 40. The flexible cord 15 is connected to the contact springs 21 by means of the screws 22, which also serve to fasten these springs to the member 19. These contact springs in turn are adapted to be flexed and to make contact with the heads of screws 23 located directly under the springs 21. These screws serve to fasten the contact clips 24 and 25, to the member 19. The clips 24 and 25 engage with the studs 13, and are made purposely resilient so that the studs may enter between them by forcing them slightly apart. To increase the area of contact, the central portion 26 of the clip 25 is cut away from the main portion of the clip, and bent down so as to be substantially parallel to the stud 13 when it enters between the clips. This portion 26 then lies flat on the stud 13. The insulating members 19 and 20 are most conveniently made by molding in a die, and are shown as being provided with depressions or hollows to accommodate the various spring clips, etc.

The flexing and unflexing of the spring contact 21, so as to make and break contact between it and the screw 23, is effected by the aid of a rocking U-shaped permanent magnet member 27. This magnet is pivoted at its central portion between the two members 19 and 20, as shown most clearly in Figs. 1 and 2, and has a pair of flattened portions 28. These flattened portions are so arranged that as the U-shaped magnet rocks to the left, they engage the springs 21 and cause contact to be made between them and the screws 23. In order to insulate the magnet member 27 from the contact clip 21, there is placed over the clip a layer of insulating material 29, and over that a thin strip of metal 30, the latter to resist the wear of the rubbing action of the flattened portion 28.

The permanent magnet member 27 is adapted to be attracted to the sole plate 12 of the iron 11 and to be held there normally. This position of the magnet is shown in Fig. 1, and corresponds to the flexed position of the spring 21. The permanent magnet is preferably made U-shaped instead of bar-shaped because it tends to retain its magnetism better. Thus the connections in this position include in series from one of the conductors of lead 15, to one of the springs 21, its corresponding screw 23, clip 25, stud 13, the heating element of the iron, back to the other stud 13, the other clip 25, screw 23, clip 21 to the other conductor in the lead 15. It is thus seen that the supplemental switch is in series with the conductors of lead 15, and serves to control the heating of the iron.

The magnet member 27 is provided with pole tips 31, loosely pivoted at the exeremities of the magnet, as shown most clearly in Fig. 4. These pole tips together with the sole plate 12 of the iron, serve to complete the magnetic circuit for the member 27, and are adapted to be subjected to the heat of the sole plate 12. The mechanical connection between the tips 31 and magnet 27 is purposely made loose so that these tips may the more readily adjust themselves accurately to the surface of the sole plate 12, and be in intimate thermal contact with it. The composition of these tips is such that at a predetermined critical temperature, there is a sudden change in the magnetic properties of the tips. Ordinarily, this sudden change manifests itself as a loss in magnetic permeability, and at the critical temperature these tips are no better conductors of magnetic flux than an air gap. The result is that the magnetic member 27 can no longer be held in the position shown in Fig. 1, since the contact springs 21 urge it with some strength in the opposite direction. Thus the member 21 rapidly snaps over; and the flattened portions 28 finally take the position shown in Fig. 3. The contact between the springs 21 and screws 23 is interrupted, and the iron is permitted to cool. The temperature chosen at which the contacts open may be such as to fall considerably below the dangerous heating of the iron 11. When the iron cools sufficiently, the magnet member 27 may be rotated by hand to close the contacts and it will be held in this position due to the return of magnetic permeability of the pole tips 31.

The composition of the tips 31, as stated hereinbefore, determines the temperature at which the switch operates. Although usually a ferruginous alloy would be chosen for this member, it is of course possible to use alloys of other metals which exhibit like properties.

The adaptation of my invention to the control of a flatiron has been detailed at length. I realize however that a great many other adaptations may be discovered, such as for the control of gas valves or of the temperature of any device. In some of these adaptations, it may be necessary to have the operating members automatically returned to their original position as soon as there is a material departure from the critical temperature. One such form is illustrated diagrammatically in Fig. 5. In this case two permanent magnets 32 and 33 are used, having their poles arranged as shown. A member 34 made of an alloy such that it will lose substantially all of its permeability at a definite critical temperature, is fastened to the north pole of magnet 32, and extends almost entirely to the south pole. This member is exposed to the temperature by which the control is to be effected. Pivoted at the free extremity of this member 34 is a soft iron armature 35 adapted to move between the limiting stops 36 and 37 and having its free end, when engaging stop 37, almost as near to the south pole of magnet 33 as its pivoted end to the south pole of magnet 32. While member 34 is below the critical temperature, it serves to direct some of the flux from the north pole of magnet 34 through the armature 35. There is thus produced a north pole at the free end of the armature, which is attracted to the south pole of magnet 33. The armature 35 is then urged against stop 37, as shown in the drawing. When the member 34 loses its magnetic permeability, the armature is magnetized by induction from the south pole of magnet 32, since the magnetic reluctance of the path between this pole and the pivoted armature is less than that between it and the north pole. The result is that the free end of armature 35 becomes a south pole, and is repelled by the south pole of magnet 33 against stop 36. The movement of the armature 35 between the two stops may be made to control a circuit including conductors 38 and 39. When the member 34 recovers its magnetic properties, the free end of armature 35 is again attracted to the south pole of magnet 33.

Various other arrangements may obviously be used to embody my invention. It is believed, however, that the two forms described are sufficient to explain the principles of operation of my invention.

I claim:

1. In a device for controlling the temperature of an electric iron having a metallic plate forming an exterior ironing surface, a switch for the iron, a metallic member arranged to be placed in intimate thermal contact with the exterior surface of the metallic plate, whereby it is affected by the temperature attained substantially at the ironing surface, and means operated in response to temperature changes in the metallic member for operating the switch.

2. In a device for controlling the temperature of an electric iron having a metallic plate forming an exterior ironing surface, a switch for the iron, a magnetic member arranged to be placed in intimate thermal contact with the exterior surface of the metallic plate, whereby its permeability may be affected by the temperature attained substantially at the ironing surface, and means responsive to a change in permeability of the magnetic member for operating the switch.

3. In a device for controlling the temperature of an electric iron having a metallic plate forming an exterior ironing surface, a switch for the iron, a pivotally mounted horseshoe magnet for operating the switch, and pole tips for the magnet of such magnetic material that their permeability is reduced materially upon their attaining a critical temperature which the ironing temperature is not to exceed, said tips being arranged to be placed in intimate thermal contact with the exterior surface of the metallic plate, whereby they are affected by the temperature attained substantially at the ironing surface.

4. The method of controlling the temperature of an electric iron having a metallic plate forming an exterior ironing surface, which comprises subjecting a metallic member to the temperature attained by the external surface of the metallic plate, and operating a switch in response to a change in the metallic member induced by a change in its temperature.

5. The method of controlling the temperature of an electric iron having a metallic plate forming an exterior ironing surface, which comprises subjecting a magnetic member to the temperature attained by the external surface of the metallic plate whereby it is permitted to change its permeability materially upon attainment of a temperature which is not to be exceeded by the iron, and operating a switch in response to the change in permeability in the magnetic member.

6. In a plug construction for performing a switching operation for an electrically operated device, an insulating support, a contacting metallic piece substantially entirely enclosed in said support and adapted to be placed in engagement with a cooperating piece on the electrically operated device, a movable contact enclosed in the support for connecting to the contact piece, and a member pivotally held in the support for moving the contact, said member having parts extending externally of the plug whereby it may be operated.

7. In a plug construction for performing a switching operation for an electrically operated device, an insulating support, a contacting metallic piece substantially entirely enclosed in said support and adapted to be placed in engagement with a cooperating piece on the electrically operated device, a movable contact enclosed in the support for connecting to the contact piece, and a U-shaped member pivoted in the support between the arms of the U for moving said contact, the arms of the U extending externally of the plug.

8. In a plug construction for performing a switching operation for an electrically operated device, a pair of similarly formed insulating members fastened together to form the plug, a pair of spring clips held between the supports in depressions formed therebetween and adapted to be slipped over contact posts on the electrically operated device, a pair of spring contacts held in the insulating members and arranged to cooperate with the spring clips near a portion thereof which is out of the path of movement of the contact posts on the electrically operated device, and a U-shaped member pivotally supported in the insulating members between the arms of the U so that the connecting bar of the U extends across the plug and in operative relation with the spring contacts, the arms of the U extending exteriorly of the plug for external operation of the spring contacts so that they may be made to connect with the spring clips.

9. In combination, an electrically heated iron having a sole plate of magnetic material, a switch, and means for operating the switch, comprising a magnet, the magnetic circuit of which is adapted to be completed by the sole plate, and which has a portion arranged to be placed in intimate thermal contact with the sole plate, and to lose a material part of its magnetic permeability upon being brought to a predetermined temperature.

10. In combination, an electrically heated iron having a metallic member heated to perform the ironing function, a switch, and means for operating the switch, comprising a magnet having a portion of its magnetic circuit arranged to be placed in intimate thermal contact with the member, and to lose a material part of its magnetic permeability upon being brought to a predetermined temperature.

11. In combination, an electrically heated iron, a switch for the iron, and means for operating the switch in response to the temperature of the iron, comprising a pivotally mounted horseshoe magnet, pole tips for the magnet, said tips being of such magnetic material that their permeability is materially reduced upon their attaining a critical temperature which the ironing temperature is not to exceed, said tips being arranged to be placed in intimate thermal contact with an exposed surface of the iron, whereby they are affected by the temperature of the iron, and means responsive to its change in magnetic state for moving the horseshoe magnet.

12. A thermostat for controlling the temperature of electrically heated devices, comprising a circuit having means for heating the device, and a magnet adapted to contact with the surface of the device for controlling the making and the breaking of the circuit.

13. A thermostat for controlling the temperature of electrically heated devices, comprising a circuit having means for heating the device, a switch in the circuit, and a magnet adapted to contact with the device and to control the switch.

14. A thermostat for controlling the temperature of electrically heated solid bodies, comprising a circuit having means for heating the body, and a magnet having a part adapted to contact with the body and a part adapted to make and break the circuit according to the temperature of the body.

15. A thermostat for controlling the temperature of electrically heated devices, comprising a circuit having means for heating the device, a switch in the circuit, and a magnet, one end of which is adapted to contact with the device and the other end of which is arranged to operate the switch.

16. A thermostat for controlling the temperature of electrically heated devices, comprising a circuit having means for heating the device, a switch in the circuit, and a magnet having its active end composed of a magnetic alloy which is adapted to contact with the solid body, said magnet being arranged to operate the switch according to the temperature of the body.

17. In a temperature control device, a magnetic member, and pole tips carried by the magnetic member having a loose connection with the magnetic member, whereby these tips may readily be placed in good thermal conducting relation with a surface, said tips being made of such material that they change their magnetic properties materially at a critical temperature.

18. A connection plug, a U-shaped member pivoted between the arms of the U in the plug, and having its arms extending outside of the plug, and contacts within the plug operated by the rotation of the U-shaped member.

19. A connection plug, a U-shaped member pivoted between the arms of the U in the plug, and having its arms extending outside of the plug, the portion between the arms having a flattened part, and a contact member within the plug adapted to be moved by the flattened part as the member is rotated.

In testimony whereof, I have hereunto set my hand.

DONALD K. LIPPINCOTT.